No. 711,191.　　　　　　　　　　　　　　　　　　　　Patented Oct. 14, 1902.
J. C. ANDERSON.
LIQUID METER.
(Application filed Mar. 10, 1902.)
(No Model.)　　　　　　　　　　　　　　　　　　　　2 Sheets—Sheet 1.
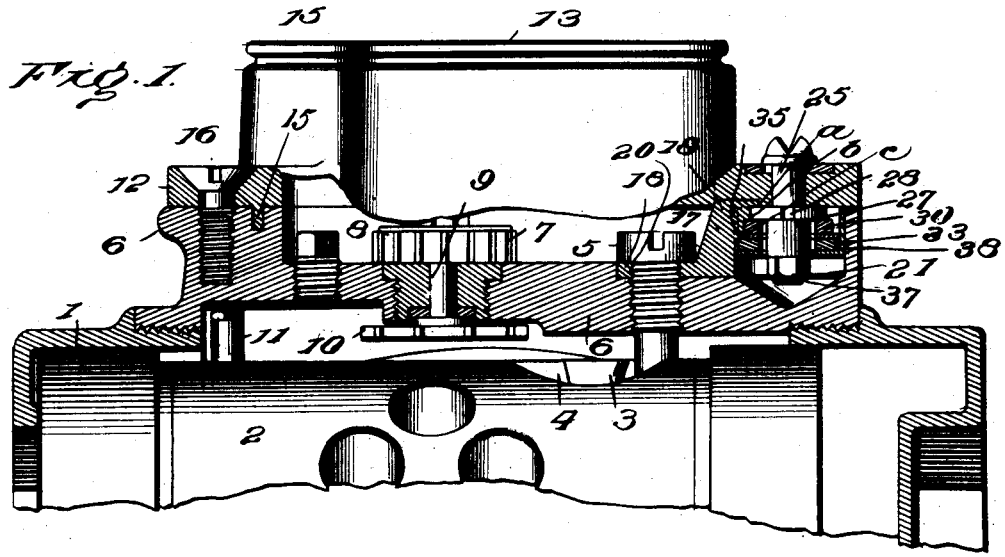
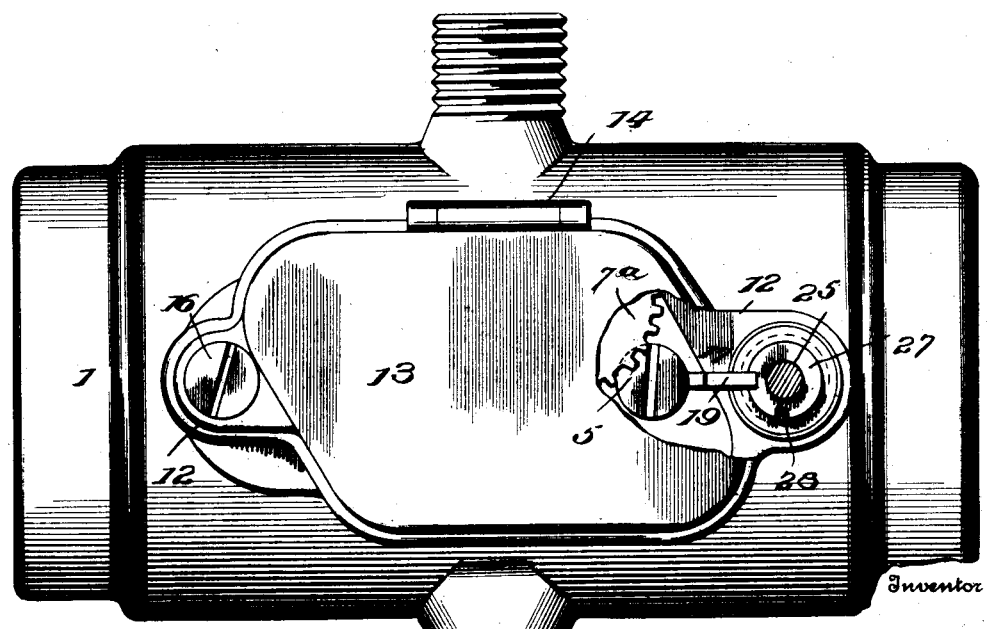

No. 711,191. Patented Oct. 14, 1902.
J. C. ANDERSON.
LIQUID METER.
(Application filed Mar. 10, 1902.)
(No Model.) 2 Sheets—Sheet 2.
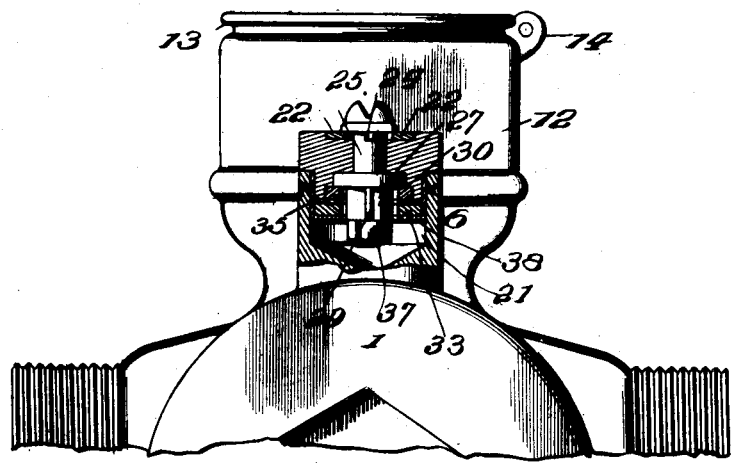
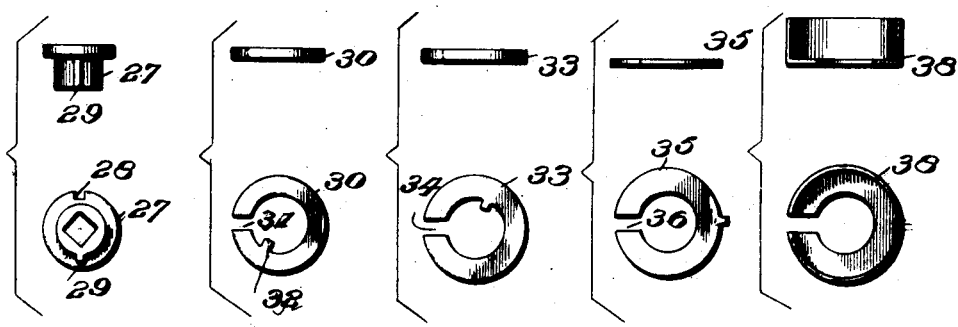
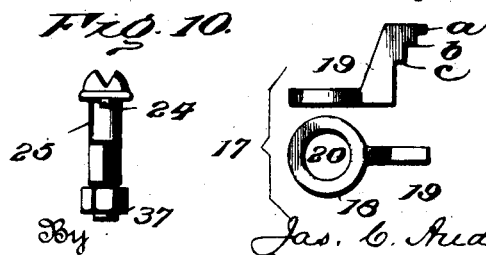

UNITED STATES PATENT OFFICE.

JAMES C. ANDERSON, OF HIGHLAND PARK, ILLINOIS.

LIQUID-METER.

SPECIFICATION forming part of Letters Patent No. 711,191, dated October 14, 1902.

Application filed March 10, 1902. Serial No. 97,717. (No model.)

*To all whom it may concern:*

Be it known that I, JAMES C. ANDERSON, a citizen of the United States, residing at Highland Park, in the county of Lake and State of Illinois, have invented certain new and useful Improvements in Liquid-Meters; and I do hereby declare the following to be a full, clear, and exact description of the invention, such as will enable others skilled in the art to which it appertains to make and use the same.

My invention relates to certain new and useful improvements in liquid-meters, and has for its object to provide means whereby the registering mechanism shall be protected against fraudulent manipulation for the purpose of altering the record made thereby.

In the use of liquid-meters in many of the large cities it has been found that the municipalities have been deprived of many hundreds of thousands of dollars of revenue by the alteration or mutilation of the registering mechanism of meters employed to record the amount of water used by citizens. Such alteration or mutilation of the registering mechanism has been accomplished by gaining access to either the under or upper side of the train of registering-gears owing to the absence of any successful means of locking the meter properly.

My invention is designed to provide a locking mechanism for meters of all kinds and which cannot be fraudulently released, and while applicable in its generic features of construction to all classes of liquid-meters it is especially applicable and is designed for use with that class of meters illustrated and described in a pending application filed by me and bearing Serial No. 97,718. In said application there is illustrated and described a liquid-meter in which the registering mechanism is operated once during every full stroke of a reciprocating and oscillating piston, the movements of which are limited by means of a radial stud on the periphery of the piston near one end having a circular race around said stud and into which projects a pin or screw-stud passing through the casing and secured thereto, its lower extremity terminating within the circular race surrounding the radial stud on the piston, which construction and arrangement prevent the removal of the piston from the cylinder or casing unless the stud projecting into the race around the radial stud on the piston be first removed. This construction and arrangement renders it impossible to reach the spur-wheel upon the shaft of the primary gear of the registering mechanism or the upper part of the register, and hence the record made by said registering mechanism cannot be fraudulently changed or reversed unless access be had to and the stud or pin projecting into the race surrounding the radial stud on the periphery of the piston be removed.

My invention consists of means for locking that portion of the case which contains the registering mechanism and which conceals and guards the head of the stud which projects into the race in the periphery of the piston against fraudulent removal, as will be hereinafter and in detail described.

In order that those skilled in the art to which my invention appertains may fully understand my invention, I will proceed to describe the same, referring by numerals and letters to the accompanying drawings, in which—

Figure 1 represents a partial side elevation and longitudinal section of a meter such as is described and claimed in my concurrent application hereinbefore referred to. Fig. 2 is a top or plan view, broken away and partly in section, to illustrate the relation between the locking mechanism and the head of the stud or screw which passes through the bottom of the registering-mechanism case and enters the race surrounding the radial stud on the periphery of the piston. Fig. 3 is an end view showing the locking mechanism, partly in plan and partly in vertical section. Fig. 4 is a side elevation and a bottom plan view of the primary tumbler of the lock. Fig. 5 is a side elevation and plan view of the second tumbler of the lock. Fig. 6 is a side elevation and plan view of the third tumbler of the lock. Fig. 7 is a side elevation and plan view of washers which may be employed between the tumblers. Fig. 8 is a central vertical section and a top or plan view of cup or case which serves to support and conceal the locking-tumblers and operating-spindle. Fig. 9 is a plan view of the index-dial. Fig. 10 is a side elevation of the operating-spindle. Fig. 11 is a side elevation and top plan view of keeper or latch of the lock mechanism.

Similar reference numerals and letters indicate like parts in the several figures of the drawings.

1 is the case or cylinder of a meter such as illustrated and described in the pending application hereinbefore referred to, and 2 is the reciprocating and oscillating piston.

3 is the stud, and 4 the surrounding race in the periphery of the piston 2, and 5 is the screw-stud, which is threaded through the upper portion 6 of the case.

7 is the primary gear of the registering mechanism, which is located in a suitable recess 8, formed in the top of the casing.

7ª represents one of the train of registering-gears.

9 is the shaft of the primary gear, and 10 is a spur-wheel secured to the lower end of said shaft and adapted to be operated by a radial stud or tappet 11 in the periphery of the piston and near one end thereof, all as fully described in the application referred to.

12 is a cap provided with a glass top, through which the register may be read, and 13 is a metal protecting-plate hinged at 14 to the cap 12. The cap 12 is provided on its bottom, near each end, with a dowel-pin 15, fitting in a suitable recess in the top 6 and which are designed to prevent the cap from being oscillated upon the spindle of the lock if the securing-screw 16 should be removed, and thus preventing access to the top of the registering mechanism.

17 is a keeper of the design clearly shown at Fig. 11, which is fitted in a recess or pocket in the casting 6 and of a design corresponding to the circular base and radially-extended latch-arm 19. The base 18 is provided with a central opening 20, through which the screw-stud 5 passes, and consequently when said stud is properly adjusted and secured in place the keeper 17 is rigidly held in the position shown at 1 and 2.

The upper part of the case 6 is formed with a pocket or recess 21 near one end to receive the lock mechanism, as clearly shown at Figs. 1 and 3. That end of the cap 12 which overlies the recess or pocket 21 in the case is formed with a vertical boss adapted to enter the recess or pocket 21, as best shown at Fig. 3, and is formed with a stepped countersink to receive the primary and second tumblers of the lock, as will be more fully explained. This boss has a gateway in radial alinement with the radial vertical keeper-arm 19, through which said arm passes.

I will now describe the locking mechanism which I have especially designed for use in a meter of the described type.

22 is an index-dial which is located within a suitable seat in the casting 12, which latter has a radial score-mark which is designed as a guide for operating the lock in the manner usual in combination-locks. The dial 22 is formed with a central opening for the spindle of the lock, and said opening is surrounded by a series of radial slots 23, adapted to receive a radial teat 24, projecting from the under side of the head of the spindle 25, so that the lock may be set on varying combinations in an obvious manner. The spindle is formed with a round head having a V-shaped kerf to receive a suitable tool for turning the same and so that downward pressure has to be exerted for the purpose presently explained. The upper portion of the shank of the spindle is cylindrical, so that it may readily rotate within its bearing in the cap 12. This cylindrical portion is succeeded by a squared portion adapted to receive the primary tumbler, and the extreme end is threaded to receive a nut 37, which secures the primary tumbler in fixed relation with the spindle. The primary tumbler 27 is formed with a radial gate 28 in its flanged portion or head and a radial wing 29 for operating the other tumblers. The head or flange of the primary tumbler is of such diameter that when the gate therein is out of register with the keeper-arm 19 said head will extend below the upper step or projection $a$ of the said keeper-arm. 30 is a second tumbler formed with a central opening, through which the cylindrical lower portion of the primary tumbler passes, and it is provided with a gateway and a radial teat 32. The diameter of this tumbler is such that when the gateway 31 is out of alinement with the keeper-arm 19 said tumbler will project under the second step $b$ of the keeper-arm. 33 is the third tumbler, similarly constructed and of such diameter that it will when its gateway 34 is out of alinement with the keeper-arm 19 project under the third step $c$ of said keeper-arm.

35 represents suitable gated washers which may be placed between the several tumblers, and said washers are located with their gateways 36 in alinement with the arm 19 of the keeper and secured in such position in any suitable manner. When the several tumblers and washers have been properly located around the spindle, the nut 37 is secured on the end of the spindle, and the primary tumbler is thus securely held upon the spindle and its flanged upper end or head in contact with the under side of the cap 12, thus preventing the withdrawal of said spindle. When the several parts have been thus arranged, a gated cup or thimble 38 is placed around the several tumblers and the stepped boss on the under side of the cap 12 and secured to the latter by screws, as clearly shown in Fig. 3.

Referring to the V-shaped kerf in the head of the lock-spindle, it will now be understood that downward pressure is necessary to rotate the spindle, and consequently all of the several tumblers are forced out of horizontal contact with the under sides of the series of steps $a$ $b$ $c$ of the keeper-arm, and hence the combination upon which the lock is set cannot be determined by the sense of touch.

While I have described with particularity a construction of lock which is best adapted for use with a meter having the peculiar chracteristics explained, it will be understood that I do not wish to be limited to any special form of lock so long as it involves the generic principle of locking the register-cap in fixed relation with and protecting the register-actuating devices intermediate of the register and those parts of the meter which control the register-actuating devices, thus preventing access in any manner to the registering mechanism for the fraudulent purpose of changing its legitimate action.

From the construction described it will be readily understood that the cap 12 can only be removed by so rotating and adjusting the several tumblers of the lock that the gateways thereof are all in alinement with the radial keeper-arm 19, when if the screw 16 be removed the said cap may be readily lifted from its seat on the casing.

While I have shown the locking mechanism of a particular form and adapted to the particular construction of meter described, I wish it to be understood that the genus of my invention involves the combination and use of a locking mechanism with the parts of a meter which confine the registering mechanism, said locking mechanism being of such character that its manipulation is dependent upon conditions known only to such party or parties as may have jurisdiction of the meters and in which such conditions are capable of predetermined changes or alterations.

What I claim as new, and desire to secure by Letters Patent, is—

1. In a meter having a casing inclosing actuating means and having registering mechanism located within a suitable cavity in the casing and concealed and protected by a removable cap or cover, the combination with secret and changeable locking mechanism intermediate of the casing and cap or cover, of means engaging the actuating means, located beneath the cap or cover and protected by the locking mechanism, for preventing the change of relation between the registering mechanism and the said actuating means through the medium of which said registering mechanism is operated; whereby the latter is protected against improper manipulation or alteration, substantially as hereinbefore set forth.

2. In a meter embodying in its organization a casing and a movable piston located therein and adapted to operate a registering mechanism located upon the upper part of the casing, a stud located in the casing and adapted to prevent the removal of the piston therefrom, and confining in fixed relation a latch or keeper; a cap protecting and covering the registering mechanism, piston-controlling stud and latch or keeper and secured in position by suitable locking devices coöperating with the fixed keeper, substantially as and for the purpose set forth.

3. In a meter such as described and in combination with the casing and removable cover, and a registering mechanism intermediate of the casing and cover, a stepped latch or keeper secured in fixed relation with the casing and between it and the cover, and a locking mechanism having gated tumblers adapted to register with the keeper and to be moved beneath the steps thereof, substantially as and for the purpose set forth.

In testimony whereof I affix my signature in presence of two witnesses.

JAMES C. ANDERSON.

Witnesses:
JNO. J. HARROWER,
D. G. STUART.